United States Patent [19]
Sharman

[11] Patent Number: 5,969,824
[45] Date of Patent: *Oct. 19, 1999

[54] ILLUMINATION FOR SCANNERS

[75] Inventor: Richard A. Sharman, Dunstable, United Kingdom

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/826,059

[22] Filed: Mar. 26, 1997

[30]  Foreign Application Priority Data

Apr. 2, 1996 [GB] United Kingdom .................. 9606981

[51] Int. Cl.$^6$ ................................................. G01N 21/25
[52] U.S. Cl. ............................................ 356/417; 358/509
[58] Field of Search ........................... 356/417, 317, 356/318, 73; 200/458.1, 459.1, 461.1, 461.2; 358/509, 527, 510–526, 528–540

[56]  References Cited

U.S. PATENT DOCUMENTS

| | | |
|---|---|---|
| 4,634,880 | 1/1987 | Lindow et al. . |
| 4,884,890 | 12/1989 | Coates . |
| 5,091,652 | 2/1992 | Mathies et al. ...................... 250/458.1 |
| 5,166,813 | 11/1992 | Metz . |

FOREIGN PATENT DOCUMENTS

| | | |
|---|---|---|
| 0 176 358 A2 | 4/1986 | European Pat. Off. . |
| 0 610 994 A2 | 8/1994 | European Pat. Off. . |
| 0 702 483 A2 | 3/1996 | European Pat. Off. . |
| 86/04988 | 8/1986 | WIPO . |
| 95/21393 | 8/1995 | WIPO . |
| 95/22058 | 8/1995 | WIPO . |

OTHER PUBLICATIONS

Stein Kamp et al; "Three Color . . . Wavelength" Cytometry vol. 2, No. 4 1982 pp. 226–230.

*Primary Examiner*—K P Hantis
*Attorney, Agent, or Firm*—Frank Pincelli

[57]   ABSTRACT

Described herein is a method and apparatus for illuminating film containing emissive interlayers wherein dichroic filters are used both to determine the excitation bandwidth for the interlayers and to prevent excitation light entering a conventional color scanner.

10 Claims, 6 Drawing Sheets

ILLUMINATION FOR SCANNERS

FIELD OF THE INVENTION

The present invention relates to illumination for scanners and is more particularly concerned with illumination for scanning of photographic films containing emissive interlayers.

BACKGROUND OF THE INVENTION

U.S. Pat. No. 4,543,308 describes the measurement of luminescence intensities in exposed and processed photographic film by means of a commercial emission spectrometer, utilizing monochromators on both the illumination and detection sides of the instrument.

EP-A-0 610 994 which corresponds to U.S. Pat. No. 5,350,650 (incorporated herein by reference) describes a color photographic system which uses a color photographic system in which fluorescent interlayers are positioned between red-, green- and blue-sensitized recording layer units (without any dye image-forming materials) which form silver images of substantially the same hue. The color records are read out by scanning both the fluorescent and transmission records. The image densities are read from the two fluorescent interlayers by scanning through red and green filters, and the transmission density being scanned separately.

It is well understood that fluorescent or luminescent layers need to be excited at a particular wavelength to stimulate the production of radiation at another wavelength. A scanning process using a densitometer, with an absorption filter placed in the illuminating light path for fluorescent readout, is disclosed therein.

European Patent Application Number 95 202 482.6, now EP 0 702 483 A2 describes an apparatus and method for reading color records in a photographic material having silver images of substantially the same hue but representing exposures in at least three regions of the visible spectrum arranged in image layers, the material having at least one fluorescent or luminescent layer between two of the image layers. An improved scanner readout is provided, using mutually exclusive dichroic filters, for excitation of the fluorescent or luminescent layer and reading of radiation reflected therefrom.

U.S. Pat. No. 4,884,890 describes an optical system in which an image photosensor is positioned at the focal plane of the system for determining very narrow line width measurements of images having varying intensities, such as, fluorescing photoresist coated lines. The system includes a microscope arrangement for focusing excitation radiation, which is filtered by a blue filter and reflected by a dichroic beam splitter, onto the surface of a specimen having a photoresist pattern formed thereon. The pattern is enlarged and transmitted through the dichroic beam splitter and focused onto an eyepiece of the microscope arrangement. The dichroic beam splitter reflects radiation in the blue range and transmits radiation in the red range.

PROBLEM TO BE SOLVED BY THE INVENTION

In the arrangement described in European Patent Application Number 95 202 482.6 above, the material is illuminated by blue and white light to obtain appropriate measurements when the material is scanned. In order to do this, several dichroic filters are employed to effect scanning of the material to obtain the desired information from the records stored thereon. These filters are expensive and the scanning process time consuming.

SUMMARY OF THE INVENTION

It is therefore an object of the present invention to provide an illumination arrangement which allows material containing image information in the form of at least three records to be illuminated and through which emitted radiation can be returned to a sensor using the same components.

In accordance with one aspect of the present invention, there is provided an apparatus for illuminating a photographic film material having at least one emissive interlayer, the apparatus comprising at least one light source for supplying excitation light for said at least one emissive interlayer in the film material, characterized in that at least one dichroic filter element is used both to direct the excitation light onto the film material and to re-direct emitted light from each emissive interlayer to a sensor.

Advantageously, said at least one dichroic filter element is arranged such that the excitation light and emitted light travel along substantially the same path in the film material.

A further light source may be provided for supplying transmission light to the film material for transmission therethrough, a filter element being provided for defining a band for the transmission light which is different to that of both the excitation light and emitted light.

It is preferred that the film material comprises red-, green- and blue-sensitized silver halide emulsion layers having two emissive interlayers, each emissive interlayer being located between respective pairs of the emulsion layers, the emissive interlayers being excited by light in a predetermined wavelength band to emit light in a further predetermined wavelength band, the excitation light and emitted light from each emissive interlayer being in different wavelength bands.

Two light sources may be provided for exciting each of the emissive interlayers, each light source having a dichroic filter element associated therewith for defining the band of excitation light.

A further dichroic filter element may be associated with one of the light sources for supplying transmission light for the film material.

ADVANTAGEOUS EFFECT OF THE INVENTION

By this arrangement, the number of filter elements required is substantially reduced. Moreover, automatic separation of the wavelengths of the illuminating light for the film material and the emitted light from the film material is obtained.

BRIEF DESCRIPTION OF THE DRAWINGS

For a better understanding of the present invention, reference will now be made, by way of example only, to the accompanying drawings in which.

DETAILED DESCRIPTION OF THE INVENTION

The present invention relates to the illumination of photographic images recorded on film materials containing a fluorescent or luminescent light-emitting species so that they can be scanned by conventional color scanning equipment. This invention is particularly useful where the normal red, green and blue bands of a scanner are used to provide an improved scanning system as described in copending U.S. patent application Ser. No. 08/824,855, filed on Mar. 26, 1997, entitled SCANNING OF IMAGES (Attorney Docket 72712), filed concurrently herewith and incorporated herein by reference.

In particular, the present invention relates to a method that uses the same dichroic filter twice in order to isolate the excitation and reading spectra.

In the same way that dichroic filters can be used in beam splitters, they can also be used to direct the excitation and emitted light in a scanner reading fluorescing film. A property of a dichroic filter is that it essentially reflects what it does not transmit.

The invention comprises a method of spectral filtering for use in scanning an image positioned between the filter and a fluorescent layer. The incident light is transmitted through a dichroic filter, onto the film, and the emitted fluorescence, from the film, is reflected from the front surface of the same filter, towards the scanner. Incident light which is scattered from the film simply passes back through the filter, and is not reflected towards the scanner. This shown in FIG. 1.

Figure 1:
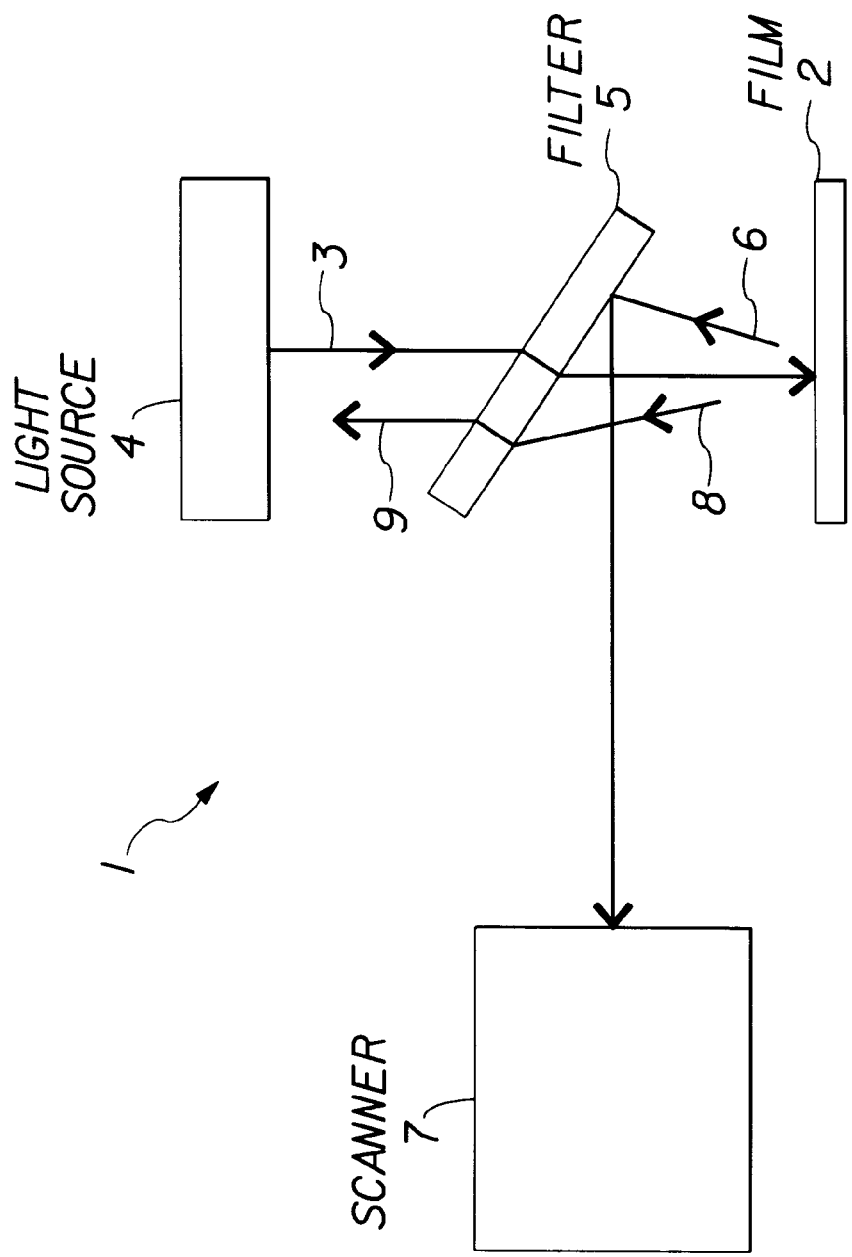
FIG. 1 is a schematic illustration of an illumination arrangement in accordance with the present invention.

FIG. 1 illustrates an illumination arrangement 1 in which a film 2 is illuminated with excitation light 3 from a light source 4 through a dichroic filter 5. Emitted light 6 from the film 2 is returned to the dichroic filter 5 where any light not transmitted is reflected towards a scanner 7. Scattered light 8 is transmitted by the dichroic filter 5 and emerges therefrom as indicated by numeral 9. In this case, the dichroic filter 5 serves both to direct excitation light 3 towards the film 2 and to direct emitted light 6 from the film 2 towards the scanner 7.

In a similar way, the incident light could be reflected by the dichroic and the emitted light transmitted by the dichroic, but in this case, care would need to be taken in the optical design to eliminate any ghost reflections as the image light passes through the dichroic.

Figure 2:
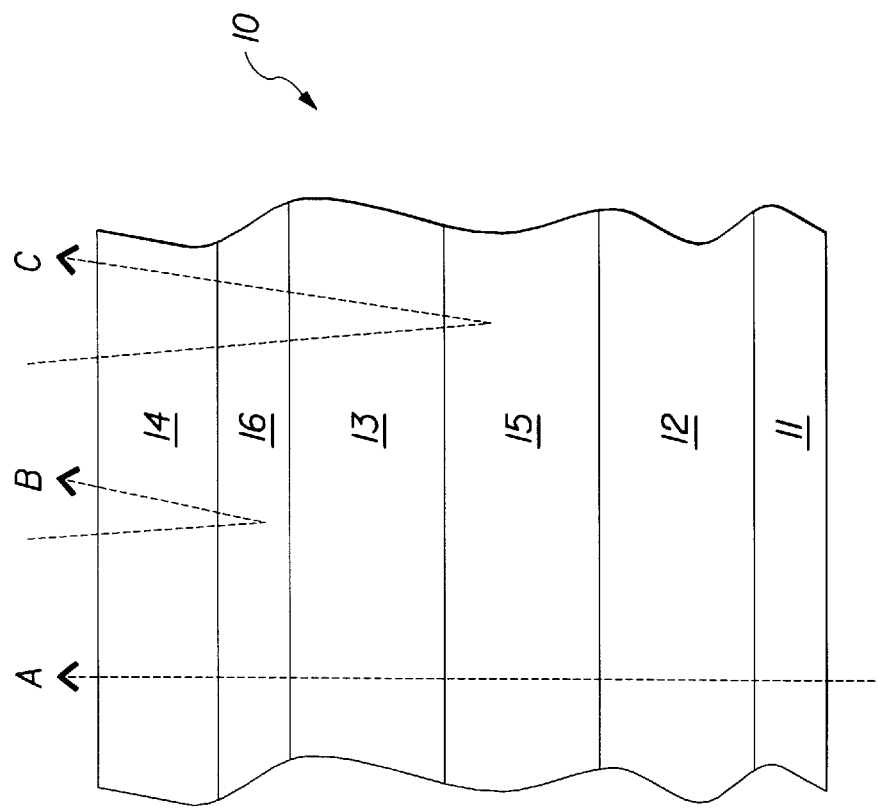
FIG. 2 is a sketch of a simplified fluorescer film structure.

A simplified arrangement of a fluorescer film 10, as described in EP-A-0 610 994, is shown in FIG. 2. The film 10 comprises a film base 11, three black-and-white (b & w) records 12, 13, 14, each sensitized to a different color, and two fluorescing interlayers (or fluorescers) 15, 16. Records 12, 13 and 14 are respectively sensitized to Red, Green and Blue light. The fluorescers 15, 16 enable decoding of the densities in each of the b & w records 12, 13, 14 when the film 10 is scanned.

The film 10 is read by making three measurements, either sequentially or simultaneously, using a single scanner, as indicated by dotted lines A, B and C. Along dotted line A, the sum of all three records is measured from the light passing through the entire film, that is, by transmission. Along dotted line B, the first fluorescer 16 is excited and the blue sensitized record 14 is read by reflection. Along dotted line C, the second fluorescer 15 is excited and the sum of the green and blue records is read by reflection.

It will be appreciated that the film 10 can be read from either side or from both sides. However, in relation to the positioning of a scanner (not shown), it is desirable to restrict the measurements to only one side of the film 10 as illustrated in FIG. 1.

When the film is scanned, the following three measurements are obtained:

$$A: Rd+Gd+Bd \text{ (transmission)} \quad (1)$$

$$B: 2 \times Bd \text{ (fluorescer 1)} \quad (2)$$

$$C: (2 \times Bd)+(2 \times Gd)(\text{fluorescer 2}) \quad (3)$$

where $Rd$, $Gd$ and $Bd$ are the densities of the Red, Green and Blue sensitized layers, respectively.

Equations (2) and (3) measure the density twice, once by the excitation light passing through the silver layer to the fluorescer, and once by the emitted light returning back through the silver layer.

Using the above measurements the separation densities can be obtained by a simple subtraction and scaling process using equations (1), (2) and (3) above:

$$Rd=(1)-(\tfrac{1}{2} \times (3))$$

$$Gd=\tfrac{1}{2}-((3)-(2))$$

$$Bd=\tfrac{1}{2} \times (2)$$

In order to scan a film which has a fluorescer, the scanner has to be capable of reading both the transmission and reflection densities of the film. The film could be read from either or both sides but to keep the scanner design practicable both the reflection and transmission densities should be read from the same side of the film, as shown in FIG. 3.

Figure 3:
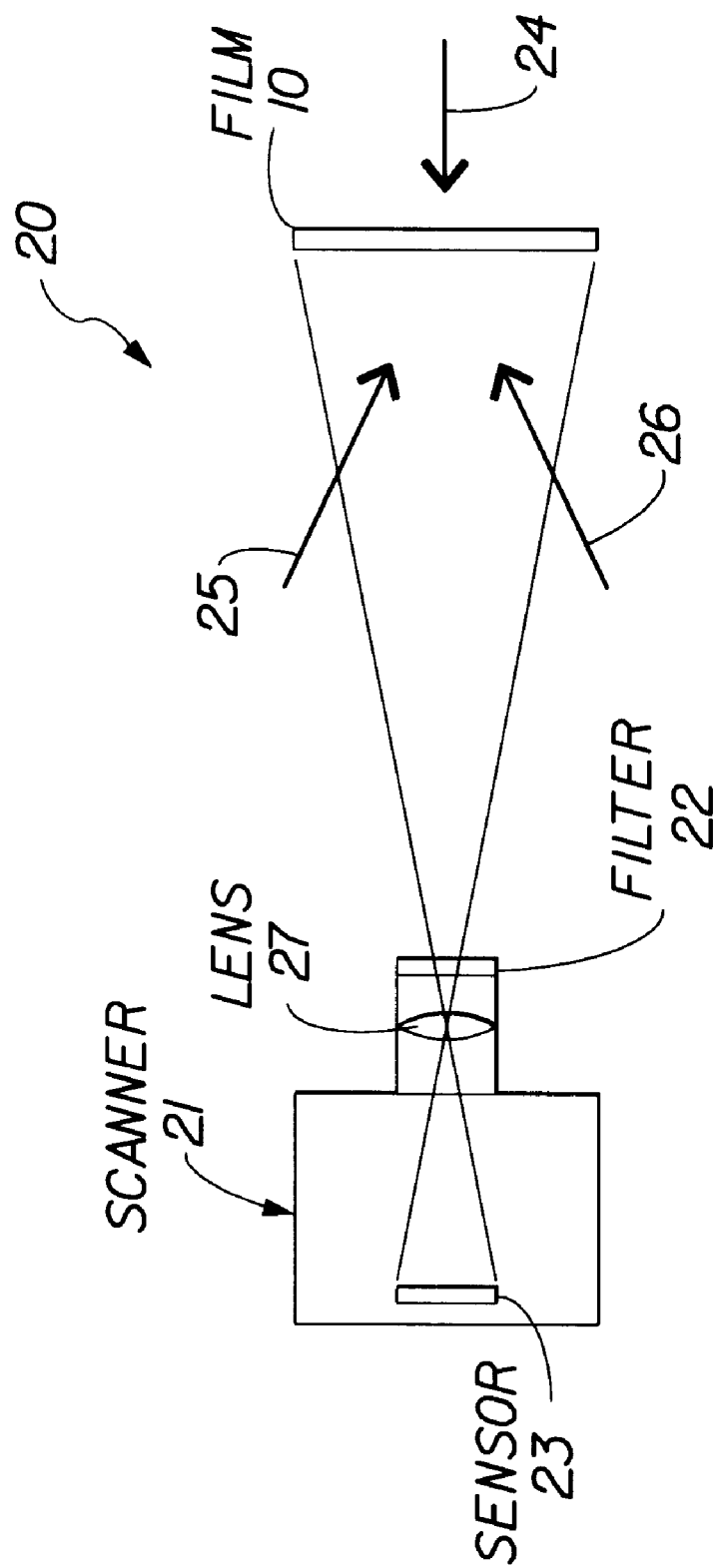
FIG. 3 is a schematic layout of a scanner.

FIG. 3 illustrates a general scanner layout 20 in accordance with the present invention. The layout 20 comprises a scanner 21 which includes filters 22, a sensor 23 and a lens 27 (none of which are shown in detail). A film 10, as described with reference to FIG. 2 above, is positioned in front of the scanner 21 and is suitably illuminated to obtain the three measurements mentioned above. The film is illuminated through its base by transmission light 24, and from its emulsion side by excitation light for the two fluorescers, indicated by 25 and 26, respectively.

In order for the image processing calculations to operate correctly, when reading the fluorescer emissions, the excitation light should pass through the same part of the film as the emitted light; otherwise equations (2) and (3) above will not be correct. If it is assumed that an error of 10% in the measurement is acceptable, then the angle between the excitation and reading light can be calculated, knowing the film emulsion thickness, and the scanning resolution.

For a 35 mm frame width of 36 mm and a line scan of 3072 pixels, the pixel size is given by:

$$\text{Pixel size}=36 \text{ mm}/3072=11.7 \text{ mm} \quad (4)$$

and the pixel area by:

$$\text{Pixel area}=11.7 \times 11.7 = 137.3 \text{ mm}^2 \quad (5)$$

If it is assumed that all of the light collected by the scanner has passed through the pixel being scanned, then all of the error is in the passage of the excitation light to the fluorescer. For an overall 10% error, 20% of the excitation light can pass through the surrounding pixels before it excites the fluorescer under the pixel being read. However, if the pixel is on an edge, then the error generated by the excitation light passing through the adjacent pixel could be much larger.

If it is assumed that the pixels are of similar density, then this corresponds to a band, around the pixel being read, with 20% of the area of the pixel, that is, 27.4 mm². This is shown in FIG. 4.

Figure 4:
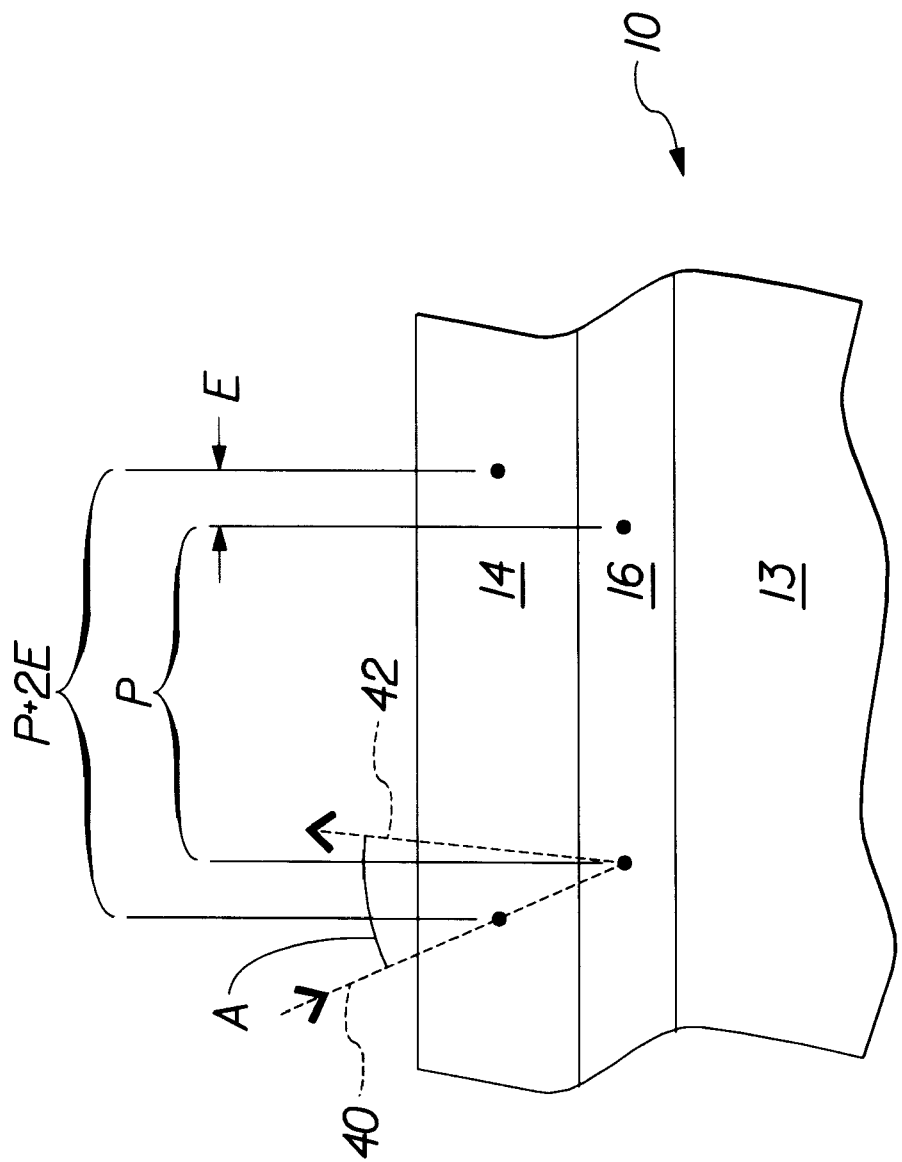
FIG. 4 is a sketch illustrating the illumination/emission geometry for a fluorescer.

In FIG. 4, a portion of film 10 is shown, that is, the blue sensitized layer 14, the green sensitized layer 13 and the fluorescer 16. The size of a pixel is denoted as P and the 10% error on each side thereof by E. Excitation light 40 for the interlayer 16 is shown passing through layer 14 and into interlayer 16. Emitted light 42 from the interlayer 16 passes upwards through pixel area P at an angle A to the excitation light 40.

Assuming that there is 46.8 mm around the pixel P, then the approximate width of band is given by:

$$27.4/46.8 = 0.59 \text{ mm}$$

For 10% error in reading fluorescer 16, the maximum angle A of the excitation light 40, with respect to the reading angle, can be calculated. Taking the distance from the center of the blue sensitized layer 14 of the film 10 to the center of the fluorescer 16 as approximately 3 mm, then the angle A of the excitation light 40 is given by:

$$A = \tan^{-1}(0.59/3.0) = 11°$$

This angle A' can also be easily calculated for the other fluorescer 15. For 10% error in reading fluorescer 15, where the distance from the center of the blue sensitized layer 14 of the film 10 to the center of the other fluorescer 15 is approximately 15 mm, the angle of excitation light is given by:

$$A' = \tan^{-1}(0.59/15) = 2.3°$$

These calculations show that if the excitation light is parallel, then these angles A, A' would be the maximum angles of the excitation light with respect to the reading angle. In any illumination system, there will be a distribution of angles but these calculations are implying that the excitation geometry should be close to, or similar to, that of the reading geometry. Naturally, it will be appreciated that the angles A, A' may be larger if the resolution of the scanner is lower, that is, the scanner has a lower number of scan lines. Similarly, the angles A, A' may be smaller for higher resolutions or for greater accuracy.

For a scanner which reads a film with two fluorescers, it may be necessary, although not essential, to provide two bands of excitation light and one band of transmission light. Such an optical arrangement, having two bands of excitation light and one of transmission light, is shown in FIG. 5.

Figure 5:
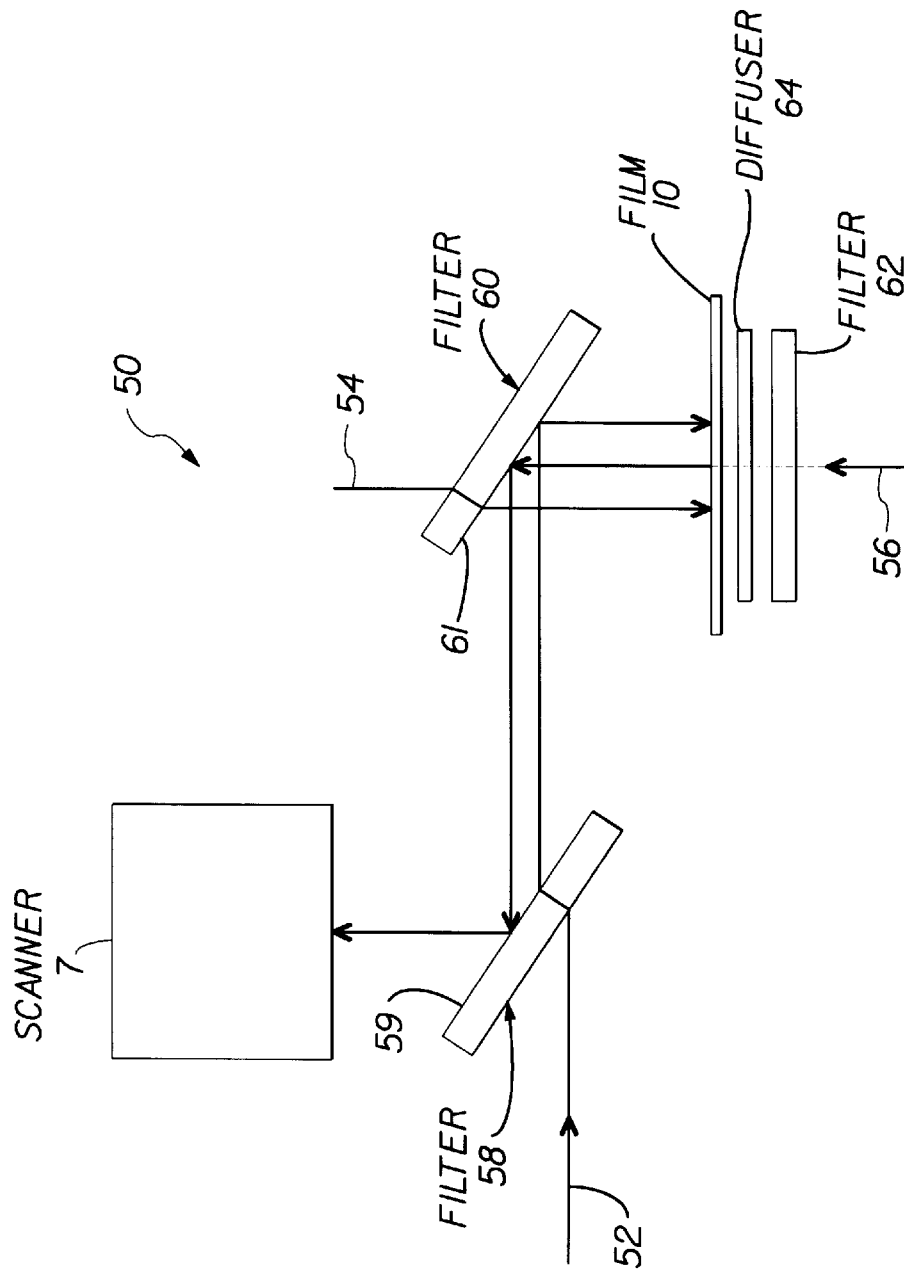
FIG. 5 is a schematic layout of an optical arrangement for illuminating the scanner shown in FIG. 3.

In FIG. 5, an optical arrangement 50 is shown which comprises two sources 52, 54, each providing excitation light for a respective one of the fluorescers (not shown) in the film 10, and a source 56 providing light for transmitting through the film 10. Three filters 58, 60, 62 are arranged in respective paths of the excitation and transmission light. Filters 58, 60 comprise dichroic filters which also act as front-silvered mirrors for the image light, that is, the light emitted from the film 10. These filters 58, 60 act as band pass filters and define respective ones of the excitation bands for each of the two fluorescers (15, 16 in FIG. 1) of the film 10. Filter 58 transmits short wavelength light and defines the excitation band for fluorescing layer 16 (FIG. 1). Filter 60 defines the excitation band for fluorescer 15 (FIG. 1). Filter 62 is also a band pass filter defining the transmission band for the transmission light from source 56. Filter 62 may also comprise a dichroic filter. This means that only three main dichroic elements are required.

The optical arrangement 50 also includes a diffuser 64 located between the film 10 and filter 62. The diffuser 64 scrambles the light for the transmission illumination of the film 10.

Filters 58, 60 are arranged like front-silvered mirrors with their respective dichroic surfaces 59, 61 toward the image light. In this way, any ghost image reflections from the other surface of the filters 58, 60 are eliminated.

Excitation light is filtered by the dichroic filters 58, 60, and any excitation light which is scattered by the film 10 passes back through the same filter, as shown in FIG. 1. This reduces the level of excitation light being directed into the scanner 7.

It will be appreciated that both filter 58 and filter 60 must reflect the transmission light as well as the emission light from the two fluorescers in the film 10 so that the scanner 7 can make the three sets of measurements as defined by equations (1), (2) and (3) above.

In operation, excitation light from source 52 passes through filter 58 and is reflected at surface 61 of filter 60 onto the film 10. Similarly, excitation light from source 54 passes through filter 60 and onto the film 10. Transmission light from source 56 passes through the diffuser 64 and the film 10. The transmitted light passing through the film 10 and the emitted light from the two fluorescers 15, 16 (see FIG. 1) is reflected first at surface 61 of filter 60, then at surface 59 of filter 58 into the scanner 7 where the three measurements according to equations(1) to (3) are taken.

Although one particular arrangement of the filters 58, 60, 62 is described in detail, it will be readily appreciated by persons skilled in the art that other arrangements of filters 58, 60, 62, mirrors and light sources (not shown) could be utilized to direct and define the three bands of light for the scanner. One such example is shown in FIG. 6 where two light sources are used.

Figure 6:
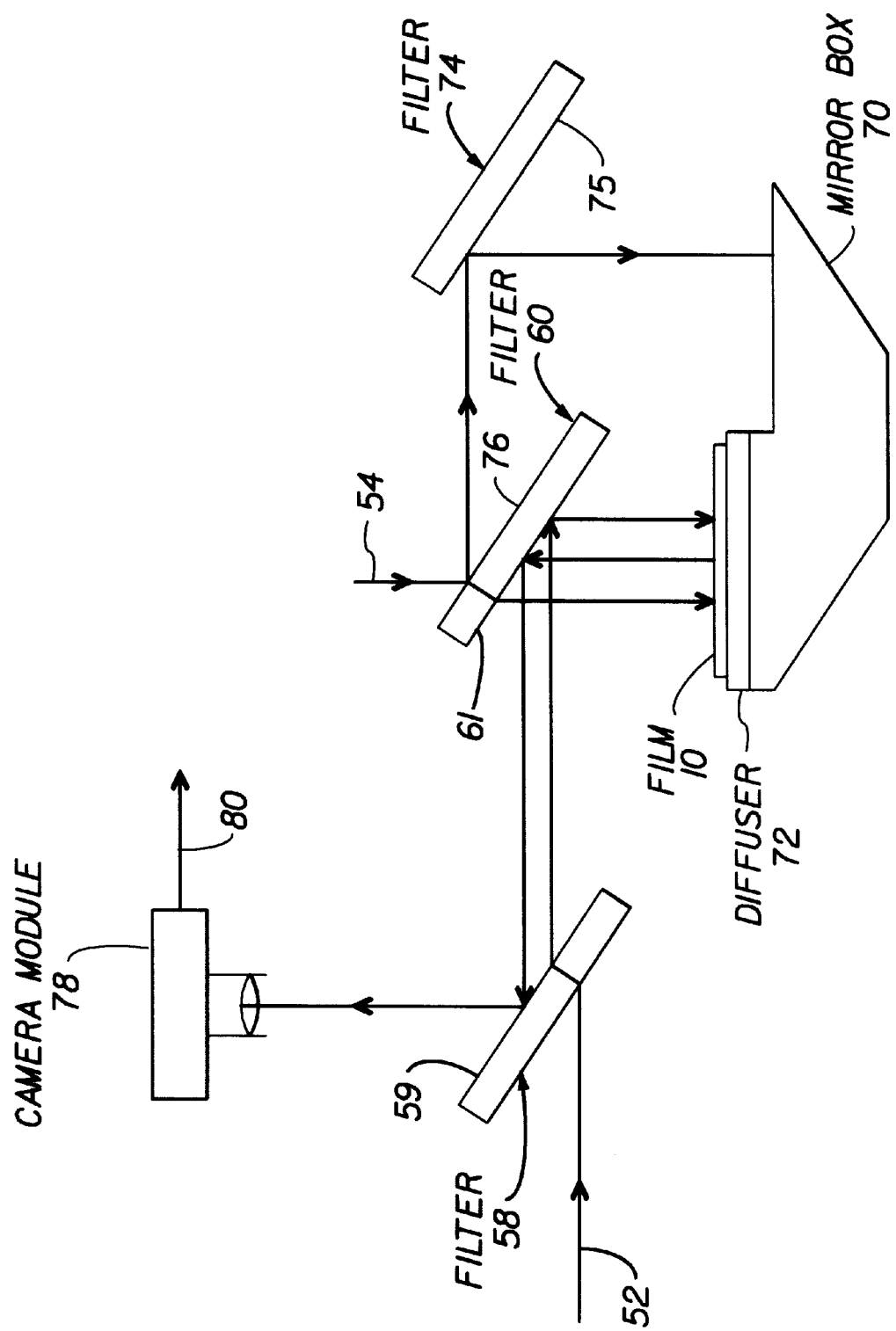
FIG. 6 is a schematic layout of a practical scanner arrangement in accordance with the present invention.

In the arrangement shown in FIG. 6, a mirror box 70 is used to both re-direct and scramble the transmission light. Reference numerals relating to components previously described will be the same. In this arrangement, light sources 52, 54 are used as described with reference to the embodiment of FIG. 5. Light source 56, FIG. 5, is replaced with mirror box 70 which has a diffuser 72 built into it, and a further filter 74. Here, light from source 54 is reflected at surface 76 of filter 60 as well as being transmitted therethrough and onto the surface of the film 10. The reflected light is incident on surface 75 of filter 74 and is directed into the mirror box 70 to provide the transmission light for the film 10 as light source 56 did in FIG. 5. A separate filter (not shown) may be incorporated in the mirror box 70 to define the band of the transmission light. Alternatively, filter 74 may provide this function.

In operation, light transmitted by the film 10 and emitted from the fluorescers (not shown) of the film is directed into a camera module 78 which supplies output signals 80 for further processing. Additionally, the camera module 78 may incorporate trimming filters 82 at its front to separate the three reading bands if the inbuilt scanner color filters are inadequate.

Although FIGS. 5 and 6 illustrate illumination arrangements in which two bands of excitation light are employed, that is, each interlayer has its own excitation band, it will be readily appreciated that a single excitation band may be employed where the second interlayer 15 (FIG. 1) has an appreciable absorption over the wavelengths of the excitation band for the first interlayer 16. In such a case, it is possible to dispense with either one of light sources 52 or 54, the remaining light source being used to excite both interlayers of the film material.

In the embodiments described above, the transmitted and emitted light are re-directed to a scanner or a camera module. It will be readily appreciated that any other suitable sensor may be employed according to the particular application. For example, the sensor may comprise a color scanner having three spectral sensitivity bands, each sensitivity band corresponding to the transmission and emitted bands. Alternatively, a black-and-white scanner with external color filters may be used, the color filters corresponding to the transmission and emitted bands. The sensor may also comprise a camera module for recording the transmission and emitted bands.

The spectral distribution of excitation and emission bands which enables a film having fluorescers to be read using conventional scanner color bands is described in copending U.S. patent application Ser. No. 08/824,855, filed Mar. 26, 1997, entitled SCANNING OF IMAGES (Attorney Docket 72712), as discussed above.

It is to be understood that various other changes and modifications may be made without departing from the scope of the present invention. The present invention being defined by the following claims:

| Parts List | |
|---|---|
| 1 | illumination arrangement |
| 2 | film |
| 3 | excitation light |
| 4 | light source |
| 5 | dichroic filter |
| 6 | emitted light |
| 7 | scanner |
| 8 | scattered light |
| 9 | emerging light |
| 10 | fluorescer film |
| 11 | film base |
| 12, 13, 14 | b&w records |
| 15, 16 | fluorescers |
| 20 | scanner layout |
| 21 | scanner |
| 22 | filters |
| 23 | sensor |
| 24 | transmission light |
| 25, 26 | excitation light |
| 27 | lens |
| 40 | excitation light |
| 42 | emitted light |
| 50 | optical arrangement |
| 52, 54, 56 | light sources |
| 58, 60, 62 | filters |
| 59, 61 | dichroic surfaces |
| 64, 72 | diffuser |
| 70 | mirror box |
| 74 | filter |
| 75, 76 | surface |
| 78 | camera module |
| 80 | output signals |
| 82 | trimming filters |

I claim:

1. Apparatus for illuminating a multilayer photographic film material carrying an image and having at least one emissive interlayer, the apparatus comprising at least one light source for supplying excitation light at a predetermined wavelength for said at least one emissive interlayer in the film material, at least one dichroic filter element is used both to direct the excitation light onto the photographic film material and to redirect an emitted light at a further predetermined wavelength from each emissive interlayer to a sensor, the at least one dichroic filter element being arranged such that the excitation light and the emitted light travel along substantially the same path in the film material.

2. Apparatus according to claim 1, wherein a further light source is provided for supplying transmission light to the film material for transmission therethrough, a further filter element being provided for defining a band for the transmission light which is different than of both the excitation light and the emitted light.

3. Apparatus according to claim 1, wherein the film material comprises red-, green- and blue-sensitized silver halide emulsion layers having two emissive interlayers, each emissive interlayers being located between respective pairs of emulsion layers, the emissive interlayers being exited by light in a predetermined wavelength band to emit light in a further predetermined wavelength band, the excitation light and the emitted light from each emissive interlayer being in different wavelength bands.

4. Apparatus according claim 3, wherein two light sources are provided for exciting each of the emissive interlayers, each light source having a dichroic filter element associated therewith for defining the band of excitation light.

5. Apparatus according to claim 4, wherein a further dichroic filter element is associated with one of the light sources for supplying transmission light for the film material.

6. Apparatus according to claim 5, further including a mirror box for directing the transmission light from the further dichroic filter element to the film material.

7. Apparatus according to claim 6, wherein the emitted light from the emissive interlayers and the transmitted light from the film material is re-directed to the sensor by the dichroic filter elements associated with the two light sources.

8. Apparatus according to claim 3, wherein the sensor comprises a color scanner having three spectral sensitivity bands, each sensitivity band corresponding to the transmission band and the emitted band.

9. Apparatus according to claim 3, wherein the sensor comprises a black-and-white scanner with external color filters which correspond to the transmission band and the emitted band.

10. Apparatus according to claim 3, wherein the sensor comprises a camera module for recording the transmission band and the emitted band.

* * * * *

UNITED STATES PATENT AND TRADEMARK OFFICE
CERTIFICATE OF CORRECTION

PATENT NO. : 5,969,824
DATED : 19 October 1999
INVENTOR(S) : Richard A. Sharman

It is certified that error appears in the above-indentified patent and that said Letters Patent is hereby corrected as shown below:

Col. 8, line 19          delete "interlayers" and insert --interlayer--.

Signed and Sealed this

Third Day of April, 2001

Attest:

NICHOLAS P. GODICI

*Attesting Officer*     Acting Director of the United States Patent and Trademark Office